US012472763B2

(12) United States Patent
Fuhse et al.

(10) Patent No.: US 12,472,763 B2
(45) **Date of Patent: *Nov. 18, 2025**

(54) SECURITY ELEMENT AS WELL AS VALUE DOCUMENT HAVING SUCH A SECURITY ELEMENT

(71) Applicant: GIESECKE+DEVRIENT CURRENCY TECHNOLOGY GMBH, Munich (DE)

(72) Inventors: Christian Fuhse, Otterfing (DE); Michael Rahm, Bad Tolz (DE); Andreas Rauch, Ohlstadt (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 442 days.

This patent is subject to a terminal disclaimer.

(21) Appl. No.: 17/098,858

(22) Filed: Nov. 16, 2020

(65) Prior Publication Data

US 2021/0070088 A1 Mar. 11, 2021

Related U.S. Application Data

(63) Continuation of application No. 13/807,814, filed as application No. PCT/EP2011/003220 on Jun. 29, 2011, now Pat. No. 10,870,305.

(30) Foreign Application Priority Data

Jul. 1, 2010 (DE) ......................... 102010025775.3

(51) Int. Cl.
*B42D 25/324* (2014.01)
*B42D 15/00* (2006.01)
(Continued)

(52) U.S. Cl.
CPC ........... *B42D 15/00* (2013.01); *B42D 25/324* (2014.10); *B42D 25/328* (2014.10);
(Continued)

(58) Field of Classification Search
CPC .................................................... B42D 25/324
See application file for complete search history.

(56) References Cited

U.S. PATENT DOCUMENTS 5,105,306 A * 4/1992 Ohala ........................ B44F 1/02 359/478
7,040,663 B1 5/2006 Plaschka et al.
(Continued)

FOREIGN PATENT DOCUMENTS

CN 1341056 A 3/2002
CN 1377437 A 10/2002
(Continued)

OTHER PUBLICATIONS

International Preliminary Report on Patentability in PCT/EP2011/003220, Jan. 8, 2013.
(Continued)

*Primary Examiner* — Kyle R Grabowski
(74) *Attorney, Agent, or Firm* — Workman Nydegger

(57) ABSTRACT

A security element for a security paper, value document or the like, having a carrier which has a motif region that includes a visually perceptible motif with a first and a second motif part, wherein the motif region includes a first micro-optic representation arrangement which presents at least two different images in viewing angle-dependent fashion as a first motif part, and a second micro-optic representation arrangement which presents a reflective surface as a second motif part, which surface appears bulged relative to the actual macroscopic spatial form of the second micro-optic representation arrangement.

17 Claims, 6 Drawing Sheets

(51) Int. Cl.

| | |
|---|---|
| ***B42D 25/328*** | (2014.01) |
| ***B42D 25/342*** | (2014.01) |
| ***B42D 25/351*** | (2014.01) |
| ***B42D 25/355*** | (2014.01) |
| ***B42D 25/373*** | (2014.01) |
| ***B42D 25/45*** | (2014.01) |
| *B44F 7/00* | (2006.01) |

(52) U.S. Cl.

CPC ......... *B42D 25/342* (2014.10); *B42D 25/351* (2014.10); *B42D 25/355* (2014.10); *B42D 25/373* (2014.10); *B42D 25/45* (2014.10); *B44F 7/00* (2013.01)

(56) References Cited

U.S. PATENT DOCUMENTS

| | | | | |
|---|---|---|---|---|
| 7,316,422 | B1 | 1/2008 | Schmitz | |
| 2004/0247874 | A1* | 12/2004 | Ryzi | B42D 25/342 428/410 |
| 2006/0056065 | A1 | 3/2006 | Schilling et al. | |
| 2006/0072225 | A1 | 4/2006 | Schilling et al. | |
| 2008/0160226 | A1* | 7/2008 | Kaule | B42D 25/425 428/29 |
| 2008/0258456 | A1* | 10/2008 | Rahm | B42D 25/324 283/85 |
| 2008/0259456 | A1 | 10/2008 | Schilling et al. | |
| 2009/0008923 | A1 | 1/2009 | Kaule et al. | |
| 2009/0091834 | A1 | 4/2009 | Ryzi et al. | |
| 2010/0177094 | A1 | 7/2010 | Kaule et al. | |
| 2010/0182221 | A1 | 7/2010 | Kaule et al. | |
| 2010/0307705 | A1 | 12/2010 | Rahm et al. | |
| 2012/0268819 | A1* | 10/2012 | Commander | B42D 25/29 359/566 |
| 2012/0319395 | A1 | 12/2012 | Fuhse et al. | |
| 2013/0063826 | A1 | 3/2013 | Hoffmuller et al. | |

FOREIGN PATENT DOCUMENTS

| | | | |
|---|---|---|---|
| DE | 102005062132 | A1 | 7/2007 |
| DE | 102008046128 | A1 | 3/2010 |
| DE | 102010019766 | A1 | 11/2011 |
| EP | 1562758 | A1 | 8/2005 |
| EP | 1570422 | B1 | 5/2007 |
| RU | 2111125 | C1 | 5/1998 |
| WO | 2004/048119 | A1 | 6/2004 |
| WO | 2006/013215 | A1 | 2/2006 |
| WO | 2007/076952 | A2 | 7/2007 |
| WO | 2008/008635 | A2 | 1/2008 |
| WO | 2009/000527 | A1 | 12/2008 |
| WO | 2009/000528 | A1 | 12/2008 |
| WO | 2009/083151 | A1 | 7/2009 |
| WO | 2010/034420 | A1 | 4/2010 |
| WO | 2011066991 | A2 | 6/2011 |

OTHER PUBLICATIONS

International Search Report in PCT/EP2011/003220, Nov. 18, 2011.

Search Report in German Application No. 102010025775.3, Oct. 8, 2010.

Chinese Search Report from Chinese Application No. 2011800413085, Aug. 4, 2014.

* cited by examiner

SECURITY ELEMENT AS WELL AS VALUE DOCUMENT HAVING SUCH A SECURITY ELEMENT

BACKGROUND OF THE INVENTION

A. Field of the Invention

The present invention relates to a security element for a security paper, value document or the like, as well as to a value document having such a security element.

B. Related Art

Objects to be protected are frequently equipped with a security element which permits verification of the authenticity of the object and at the same time serves as protection from unauthorized reproduction.

Objects to be protected are for example security papers, identity documents and value documents (such as e.g. bank notes, chip cards, passports, identification cards, identity cards, shares, exhibits, deeds, vouchers, checks, admission tickets, credit cards, health cards, etc.) as well as product authentication elements (such as e.g. labels, seals, packages, etc.).

There are known security elements which have a micro-optic representation arrangement in the form of a moire magnification arrangement, as it is described e.g. in WO 2007/076952 A2, or in the form of a modulo magnification arrangement, as it is described e.g. in WO 2009/000528 A1, in order to produce a three-dimensional pictorial impression which is memorable. Simultaneously, such a security element is difficult to imitate, since the micro-optic construction is difficult to copy or reproduce. However, since forgers always work on forging known security elements, there is a need for security elements having elevated forgery resistance.

On these premises, the invention is based on the object of providing a security element for a security paper, value document or the like, which is more difficult to copy or reproduce.

SUMMARY OF THE DISCLOSURE

According to the invention this object is achieved by a security element for a security paper, value document or the like, having a carrier which has a motif region that makes available a visually perceptible motif with a first and a second motif part, wherein the motif region comprises a first micro-optic representation arrangement which presents at least two different images in viewing angle-dependent fashion as a first motif part, and a second micro-optic representation arrangement which presents a reflective surface as a second motif part, which surface appears bulged relative to the actual macroscopic spatial form of the second micro-optic representation arrangement.

In the security element according to the invention, the motif region has the first and second motif part, which comprise different micro-optic representation arrangements that normally make clearly different demands on their manufacturing processes, in particular origination. This means that a forger has to master both manufacturing processes, which elevates the forgery resistance.

In addition, the security element according to the invention, due to the two micro-optic representation arrangements, has a very high optical attractiveness and thus a particularly high recognition value. This causes the user, if the security element is for example a security element for a bank note, to check the bank note for authenticity preferably on the basis of this attractive security element. As a result, the demands on a forger are increased, as he must imitate or copy both micro-optic representation arrangements in high quality, which is very elaborate, in order to manufacture a forgery which is not recognized as such by the user.

The two motif parts are preferably arranged to be (spatially) contiguous, so that the images presented by the two micro-optic representation arrangements can be perceived as a single motif by the user.

The contiguous arrangement is understood to mean in particular that the distance of the two motif parts is preferably smaller than 1 mm and particularly preferred smaller than 0.2 mm. Further, the two motif parts can directly border on each other.

For the user it is therefore preferably not recognizable at least in a certain viewing or illumination situation that two different micro-optic representation arrangements are present. He only recognizes the optically differently represented motif parts, but quasi sees this as an aesthetic stylistic means for the representation of the motif. He will therefore perceive the entire motif as such at least in the certain viewing or illumination situation.

The security element can be configured preferably such that one of the two motif parts at least partly surrounds the other of the two motif parts. In particular, the surrounding motif part can completely surround the other motif part in the manner of a frame.

It is further possible that the two motif parts at least partly overlap and/or at least in certain regions are nested in each other.

A framing or the arrangement of the first and second motif part in very small distances increases the forgery resistance in particular when the two micro-optic representations must be manufactured with different origination methods and/or cannot be embossed simultaneously. A forger then does not only have to master two origination and/or embossing methods, but also position the motifs manufactured therewith in exact register to each other. In particular nested motif parts are then extremely difficult to forge.

A possibly existing different dependence of the optical appearance of the two micro-optic representation arrangements on the present viewing or illumination situation can be used also in targeted fashion for further effects. In particular, the security element according to the invention can advantageously be configured such that depending on the viewing and/or illumination situation the representation of one of the micro-optic representation arrangements dominates, while the representations of the first or second micro-optic representation arrangement in a different viewing and/or illumination situation supplement each other to an overall motif.

In a further advantageous embodiment, which will hereinafter be described in more detail, the first micro-optic representation arrangement yields at a constant viewing angle a representation independent of the illumination direction, while the representation of the second micro-optic representation arrangement varies depending on the illumination direction.

The security element can further be configured such that one of the two micro-optic representation arrangements represents a background, in front of which the other of the two micro-optic representation arrangements shows an object, so that altogether a three-dimensionally appearing total view is perceptible as a motif.

In the security element according to the invention, the first micro-optic representation arrangement can present the at least two different images in viewing angle-dependent fashion such that the images at least in certain regions overlap and/or are nested in each other.

The first micro-optic representation arrangement can especially advantageously present two different views of the same object as the at least two different images.

It is further possible that the at least two different images are presented such that for a viewer there results a stereographic representation of an object with absolute depth information. For the viewer the object thus seems to be positioned in front of or behind the carrier, the apparent distance from the carrier and thus the depth information being defined by the configuration of the first micro-optic representation arrangement.

In particular, more than two different images of the same object can be presented by means of the first micro-optic representation arrangement such that there results a parallax. There can thus be achieved that upon a change of the viewing angle, image components of the first motif part in the foreground move relative to the image components of the first motif part in the background. This can even lead to the fact that one can look quasi-behind an object represented in the foreground of the first motif part.

In an advantageous embodiment, the first micro-optic representation arrangement can have a hologram. The hologram can be for example an embossed hologram. It can in particular be a volume hologram. Further, the hologram can be, in a classical way, a directly exposed hologram or also a computer-generated stereogram.

In a different advantageous embodiment, the first micro-optic representation arrangement may comprise microstructures as well as micro-imaging elements, in order to image the microstructures in magnified form. In particular, the first micros optic representation arrangement can be configured as a microlens tilt image, as a moire magnification arrangement, or as a modulo magnification arrangement.

The micro-imaging elements can be configured as focusing elements. They can be configured as one-dimensionally focusing elements (for example cylindrical lenses or corresponding micro-concave mirrors) or also as two-dimensionally focusing elements (for example spherical or aspherical lenses or corresponding micro-concave mirrors). It is further possible that the micro-imaging elements are configured as hole grids.

The microstructures and/or the micro-imaging elements can be arranged in a one- or two-dimensional grid, the grid spacing preferably being smaller than 300 μm, in particular smaller than 100 μm, and particularly preferably smaller than 40 μm.

In the security element according to the invention, the first micro-optic representation arrangement can present a tilt image with at least two different views of the same object by means of the at least two different images. In so doing, the different views can show the same object in such a way that there results a stereographic depth impression. The different views can also have, however, a parallax slightly deviating from the parallax necessary for absolute depth information, so that for the viewer there is presented, in addition to a three-dimensional impression, a motion of the represented object upon change of the viewing angle. It is further possible to represent the two different views in orthoparallactic manner, as it is described e.g. in WO 2007/076952 A2. Here, the representations for the viewer's left and right eyes permit no assignment of a depth, strictly speaking, because the viewing directions from which the viewer sees the object with his left and right eyes do not intersect.

The first micro-optic representation arrangement can therefore also be configured such that it makes available a viewing angle-dependent kinetic effect, whereby this can be effected with or without absolute depth information relative to the carrier. In particular, orthoparallactic representations are possible.

The second micro-optic representation arrangement is in particular configured such that the reflective surface of bulged appearance presents a reliefed impression. This impression is in particular so that independent of the viewing angle always the same reliefed impression is conveyed. The viewer has the impression of looking at a bulged, reflective surface, although the macroscopic spatial form of the second micro-optic representation arrangement is normally planar.

Advantageously, the second micro-optic representation arrangement has embossed microscopic structures which are furnished with a reflection-enhancing coating.

In particular, the second micro-optic representation arrangement can have a multiplicity of reflective facets with varying orientations. The orientations are preferably chosen such that due to the thus specified reflection directions, for a viewer the bulged surface is imitated or simulated. "Reflective" facets here are understood to be not only facets which have a reflectance of nearly 100%, but also facets which are configured to be semitransparent (e.g. with a very thin or gridded metal layer) or even largely transparent (e.g. with a high-refractive dielectric coating). If the facets form the interface between layers with different refractive indices, by refraction the simulated bulged surface can become visible also in transmission. For this purpose, the facets for example can be embossed in a high-refractive embossing lacquer and embedded in a low-refractive protective lacquer. It is further preferred that the facets have a maximum size which lies below the spatial resolving power of a viewer (without optical aids). Thus, the lateral dimensions are preferably smaller than 300 μm, in particular smaller than 100 μm, and particularly preferably smaller than 20 μm. The facet height is preferably smaller than 20 μm, in particular smaller than 10 μm, and particularly preferably not greater than 5 μm.

It is further possible, that the second micro-optic representation arrangement has a reflective Fresnel structure with varying grating period. Furthermore, the second micro-optic representation arrangement can have asymmetric diffraction structures or matt-structure grating images.

The configuration with a multiplicity of reflective facets can be realized in particular by means of a sawtooth-like configuration of a surface e.g. an embossing lacquer layer as well as a corresponding mirror coating. The width of such sawteeth is preferably smaller than 300 μm, in particular smaller than 100 μm, and particularly preferably smaller than about 20 μm. The height of the sawteeth is preferably smaller than 20 μm, in particular smaller than 10 μm, and particularly preferably not greater than 5 μm.

In the security element according to the invention the visually perceptible motif can exclusively have the first and second motif part. Of course, it is also possible that the visually perceptible motif has more than two motif parts, for example, three, four, etc. In this case it is preferred that in the further motif parts there are present corresponding micro-optic representation arrangements, with which there is made available a three-dimensional representation with absolute depth information, a reflective surface which appears bulged relative to the actual macroscopic spatial form, or a viewing angle-dependent kinetic, tilt and/or alternating effect with or without three-dimensional effect.

In the security element according to the invention, the carrier can have a foil and at least parts of the two micro-optic representation arrangements can be realized using the same foil.

The security element can be configured as a multilayer layered composite.

The security element can have in particular a first and second embossing lacquer layer between which there is preferably arranged a carrier layer. The first and second embossing lacquer layer and the possibly provided carrier layer can form the carrier of the security element.

In an advantageous realization, in the first embossing lacquer layer there are embossed micro-imaging elements of the first micro-optic representation arrangement and microscopic structures, for example sawtooth structures or Fresnel structures, of the second micro-optic representation arrangement, the microscopic structures being furnished with a reflection-enhancing coating. In the second embossing lacquer layer there are embossed microstructures of the first micro-optic representation arrangement, which are imaged in magnified form by means of the micro-imaging optic, in order to present the at least two different images in viewing angle-dependent fashion. The micro-imaging elements can be refractive or reflective elements. If they are reflective elements, these are preferably also furnished with a reflection-enhancing coating. Preferably, the application of the coating is carried out in one step for the microimaging elements and the microscopic structures.

It is further possible to form the microscopic structures of the second micro-optic representation arrangement not in the first embossing lacquer layer but in the second embossing lacquer layer (including the reflection-enhancing coating).

Alternatively, a third embossing lacquer layer can be provided, in which the microscopic structures are embossed as well as furnished with the corresponding reflection-enhancing coating. The third embossing lacquer layer can be connected via a second carrier layer with the second embossing lacquer layer.

Further, the microstructures to be imaged can be embossed not only in the region of the first motif part, but also in the region of the second motif part. This facilitates the manufacturing and leads to further interesting optical effects which are difficult to imitate.

The multilayer layered composite of the security element preferably has a total thickness of less than 500 in particular less than about 100 μm and particularly preferably of less than 50 μm.

The invention also comprises a value document having a security element of the just stated type including its developments.

The security element can be configured in particular as a security thread, tear thread, security band, security strip, patch or as a label for application to a security paper, value document or the like. In particular, the security element can span transparent or at least translucent regions or recesses.

The term security paper here is understood to mean in particular the precursor to a value document yet unfit for circulation, which besides the security element of the invention can also have further authenticity features. Value documents are understood here to be, on the one hand, documents produced from security papers. On the other hand, value documents can also be other documents and objects that can be furnished with the security element of the invention in order for the value documents to have uncopiable authentication features, thereby making it possible to check authenticity and at the same time preventing unwanted copying.

It is evident that the features mentioned hereinabove and those to be explained hereinafter are usable not only in the stated combinations, but also in other combinations or in isolation, without going beyond the scope of the present invention.

DESCRIPTION OF THE DRAWINGS

Hereinafter the invention will be explained more closely by way of example with reference to the attached drawings, which also disclose features essential to the invention. For more clarity, the Figures do without a representation that is true to scale and to proportion. There are shown.

DETAILED DESCRIPTION OF EXEMPLARY EMBODIMENTS

Figure 1:
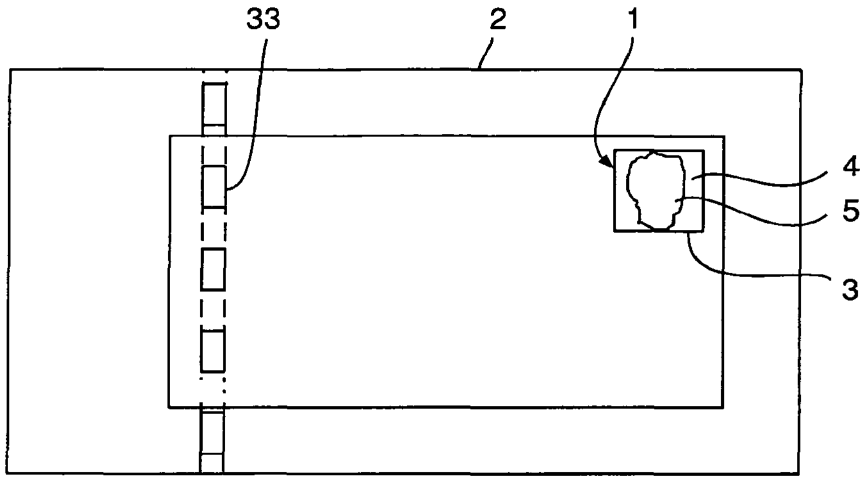
FIG. 1 a plan view of a bank note having a security element according to the invention.

In the embodiment shown in FIG. 1, the security element 1 of the invention is integrated in a bank note 2 such that the security element 1 is visible from the front side of the bank note 2 shown in FIG. 1.

The security element 1 is configured as a reflective security element 1 with a rectangular motif region 3 which is divided into a first motif part 4 and a second motif part 5.

Figure 2:
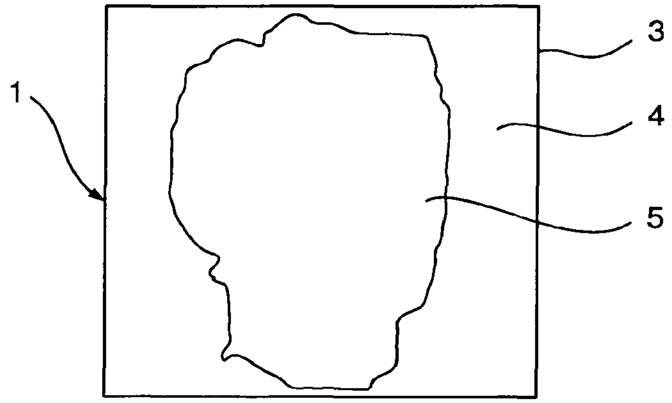
FIG. 2 a magnified plan view of the security element of FIG. 1.

The first motif part 4 here surrounds the second motif part 5, as to be inferred from the magnified representation in FIG. 2.

Figure 3:
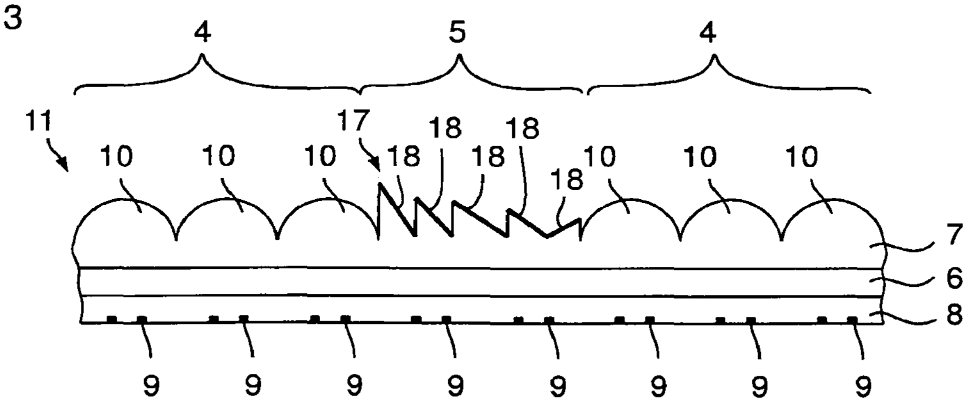
FIG. 3 a cross-sectional view of the security element of FIG. 2.

As shown in particular in the schematic sectional view of the motif region 3 in FIG. 3, the motif region 3 has a carrier foil 6 (which can be for example a PET foil) as well as an upper and lower embossing lacquer layer 7, 8. In the lower embossing lacquer layer 8 there are arranged microstructures 9, which can be filled in particular with ink, in a plane perpendicular to the drawing plane of FIG. 3 in a grid with fixed geometry (here for example a hexagonal grid) and thus areally in a first microstructure pattern. Alternatively to production in an embossing lacquer layer, the microstructures 9 can also be realized in a different way on the carrier foil 6. In particular, also printed microstructures are conceivable. Besides, the microstructures 9 can also be formed, as stated in WO 2009/083 151 A 1, by metallized subwavelength structures, in particular subwavelength gratings or moth-eye structures or produced by transfer of metallic structures, as this is described for example in the German patent application DE 102010019766.1.

The upper embossing lacquer layer 7 is so configured that it has a multiplicity of micro lenses 10 in the first motif part 4. The micro lenses 10 are arranged in a plane perpendicular to the drawing plane of FIG. 3 in a grid with fixed geometry (here for example a hexagonal grid) and thus areally in a first pattern, the first pattern in the embodiment being so adjusted to the first microstructure pattern and the two patterns being so aligned with each other that upon viewing of the security element 1 the micro lenses 10 form together with the microstructures 9 a moire magnification arrangement. The basic principle of a moire magnification arrangement is described for example in WO 2007/076952 A2, whose total content is hereby incorporated.

Figure 4:
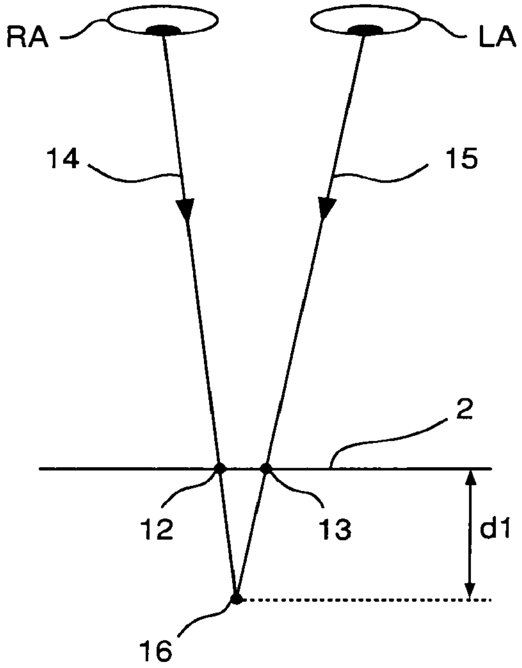
FIG. 4 a schematic view for explanation of the mode of functioning of the first micro-optic representation arrangement.

The moire magnification arrangement in the region of the first motif part 4 forms a first micro-optic representation arrangement 11, with which, as to be described in detail hereinafter, the number 105 is so represented to the viewer in multiple fashion here that it appears behind the plane of the bank note 2. This is obtained by the viewer's left and right eyes LA and RA being presented different views of the object to be represented (here the number 105) which respectively show the object viewed from the corresponding direction. In FIG. 4, for simplifying the representation, the object is drawn in as a point, the user's right eye RA seeing the object at the position 12 and the user's left eye LA seeing the object at the position 13. Thus, the viewer sees the object with his two eyes from the different directions 14, 15 which intersect at the position 16, so that for the viewer the object is located at the position 16 and hence at distance dl behind the bank note 2. For the viewer there thus results absolute depth information for the object.

Figure 5:
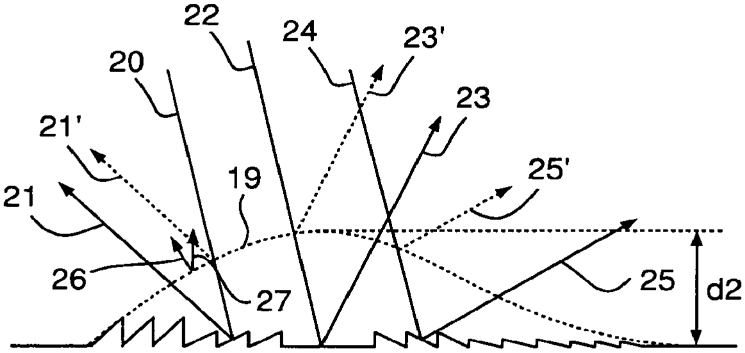
FIG. 5 a schematic view for explanation of the mode of functioning of the second micro-optic representation arrangement.

In the region of the second motif part 5 there is formed a second micro-optic representation arrangement 17, which in the embodiment has a multiplicity of mirror-coated facets 18 in the upper embossing lacquer layer 7. Instead of minor-coated facets 18, the embossing lacquer layer can also contain other embossed structures, in particular reflective Fresnel structures with varying grating period, asymmetric diffraction structures or matt-structure grating images of bulged appearance. With the second micro-optic representation arrangement 17 the viewer is presented with a reflective surface, which appears bulged relative to the actual macroscopic spatial form of the second micro-optic representation arrangement I 7. As to be inferred from the schematic representation in FIG. 5 for explanation of the principle of the second micro-optic representation arrangement 17, incident light is reflected at the facets 18 in the same directions in which a bulged surface 19 would reflect the light.

Thus, the incident light beam 20 is reflected in the direction 21, which is parallel to the direction 21', which corresponds to the direction upon reflection on the surface 19. The same holds for the light beams 22 and 24 which are reflected in the directions 23 and 25. These directions 23 and 25 are parallel to the directions 23' and 25', which are the reflection directions upon reflection at the surface 19.

The facets 18 are dimensioned such that an observer cannot resolve them without aids. Thus, the facets 18 can have dimensions, in the direction perpendicular to the drawing plane, of for example 15 μm and a height of for example 5 μm.

From the reflection behavior of the second micro-optic representation arrangement 17 a viewer concludes that in the second motif part 5 the bulged surface 19 is present with the depth d2. Thus, for example in the case of the light beam 20, the reflective behavior indicates that the local surface normal points in the direction 26, which is clearly different from the macroscopic surface normal (arrow 27) of the second micro-optic representation arrangement 17 in this region. By means of the second micro-optic representation arrangement I 7 there is hence imitated a bulge by directional reflection, thereby resulting only indirectly a depth impression or a 3D impression. This impression can also be designated "2½"-dimensional representation or reliefed representation.

In particular, by means of the second micro-optic representation arrangement I 7 no parallax is produced, so that the depth impression is substantially based on the experience of the viewer, which depth impression implicitly presupposes more information. If to a viewer an area appears to be bulged toward the front, the viewer concludes therefrom that the center region of the bulged area, from his perspective, must lie further toward the front than the edge area.

In the embodiment described herein by means of the second micro-optic representation arrangement I 7 a head of a woman is represented.

Figure 6A:
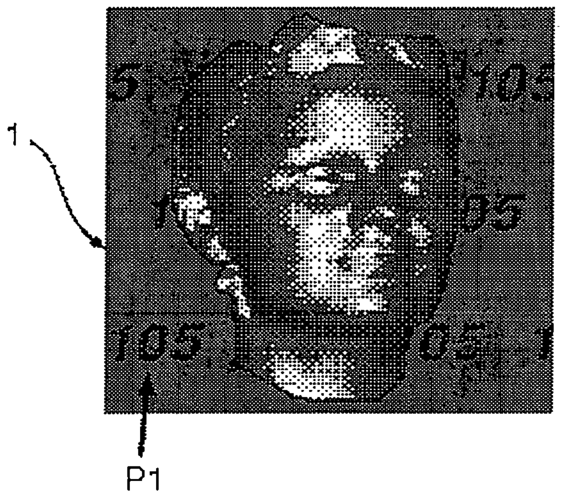
FIGS. 6A-6C representations of the security element of the invention from different viewing directions.
Figure 6B:
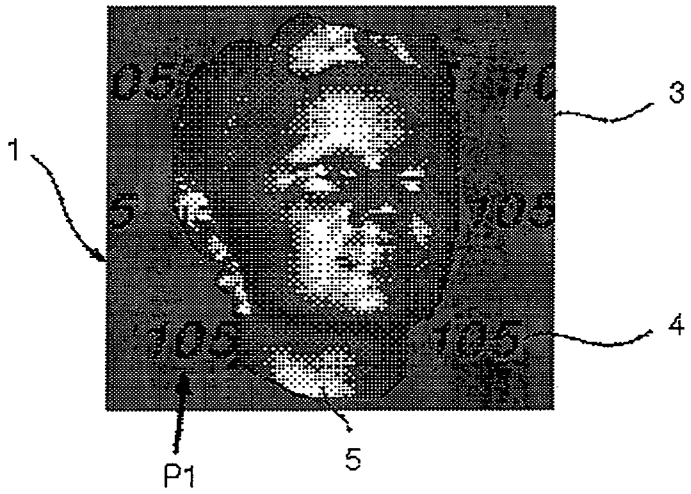
Figure 6C:
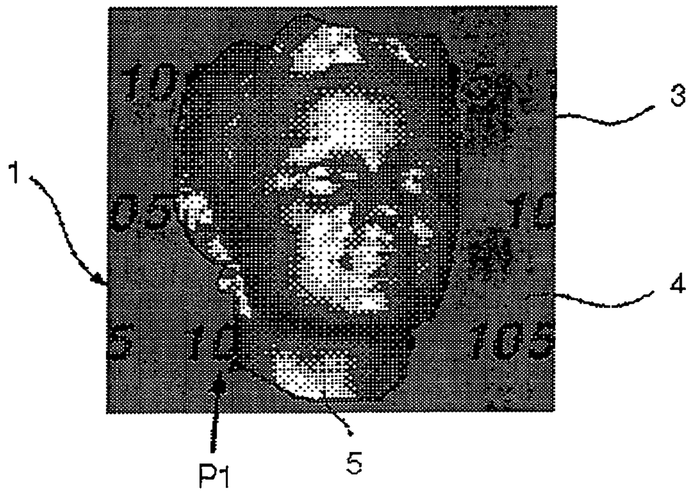

In the FIGS. 6A, 6B and 6C, the security element I is shown as it appears to a viewer from different viewing angles, provided that the security element I is illuminated such that the viewer stands respectively in the mirror reflection of the light source. On this assumption, the view of the female portrait in the second motif part 5 always remains the same, while the representation of the numbers I 05 lying in the depth is shifted horizontally from the left to the right due to the parallax. Thus, in the view from the left according to FIG. 6A, the number I 05 designated with arrow PI is located to the left of the neck of the female portrait. In the central view according to FIG. 6B, the number I 05 is just beginning to disappear behind the female portrait. In the view from the right according to FIG. 6C, the digit 5 of the number I 05 is no longer visible now.

The first micro-optic representation arrangement 11 hence yields different images in dependence on the viewing angle, while the representation of the second micro-optic representation arrangement 17 regarding its spatial effect does not depend on the viewing angle. The first micro-optic representation arrangement 11 yields more than two different views of the numbers I 05 in the way that the described motion of the numbers I 05 relative to the female portrait arises upon change of the viewing direction. Thus a parallax is present.

Figure 7A:
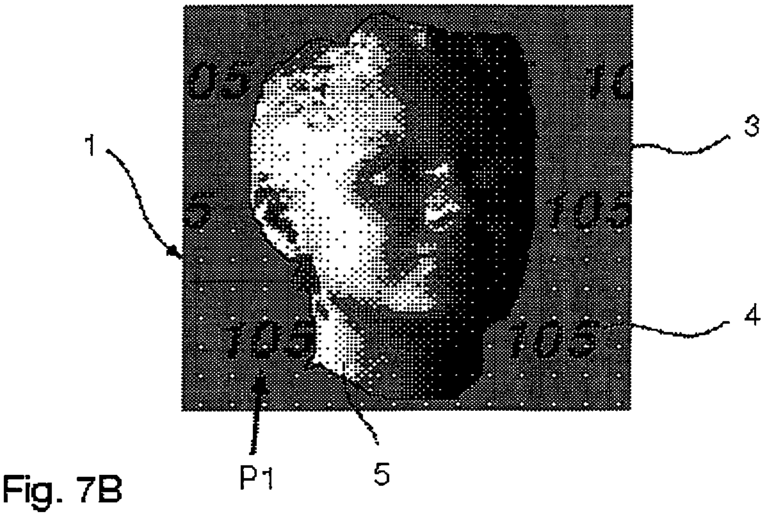
FIGS. 7 A-7C views of the security element of the invention from the same viewing angle but with different illumination devices.
Figure 7B:
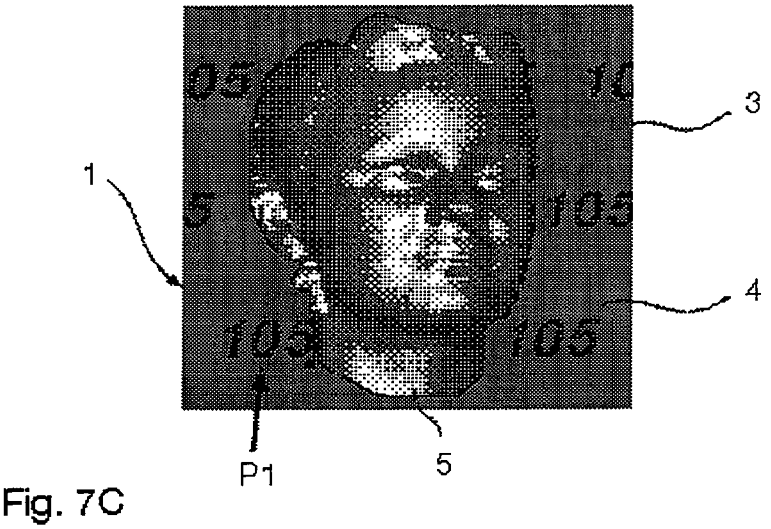
Figure 7C:
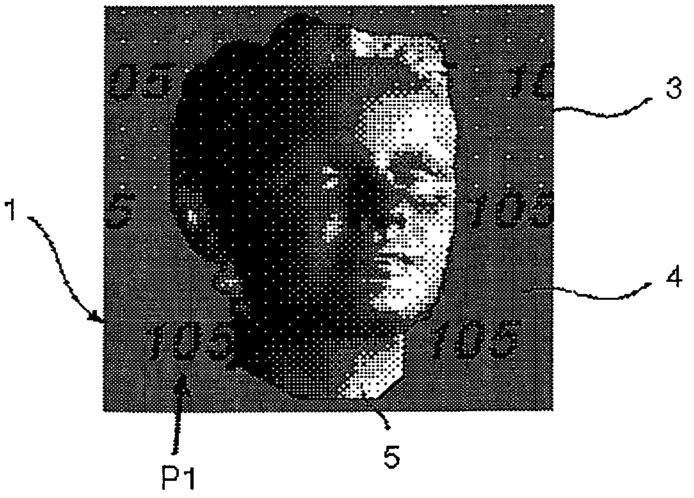

In FIGS. 7 A, 7B and 7C the security element I according to the invention is respectively shown in the same viewing direction from the front, the position of the light source and thus the illumination direction, however, varies. In FIG. 7 A the security element I is illuminated from the left. In FIG. 7B the security element I is illuminated from the front, and in FIG. 7C the security element I is illuminated from the right. From the representations of FIGS. 7 A-7C it is clearly apparent that the female portrait and thus the second motif part 5 reflects the light corresponding to the bulge of the simulated head. The positions of the numbers 105 (arrow P1) lying in the depth, however, do not change, since the viewing direction and thus the viewing angle were not changed. In practice, the position of the light source is firm, and an observer concludes from the position of the light reflexes and the motion thereof upon tilting of the security element the form of the simulated bulge.

The first micro-optic representation arrangement 11 thus yields in this embodiment at a constant viewing angle a representation independent of the illumination direction, while the representation of the second micro-optic representation arrangement 17 varies in accordance with the imitated reflective and reliefed formation of the female portrait.

In the described embodiment there is thus obtained through the moire magnification arrangement 11 an absolute depth effect by which the periodically recurring number 105 located at the depth d1 is represented to the viewer. The microstructures 9 can, as already mentioned, preferably be filled with ink, so that the numbers 105, on the one hand, and the remaining region of the first motif part 4, on the other hand, appear matt but of different color. In front of this first motif part 4 there is located the second motif part 5, in which the metallically lustrous female portrait of bulged appearance is shown via an arrangement of metallized microscopic sawtooth gratings.

The first micro-optic magnification arrangement 11 can be configured not only as a moire magnification arrangement, but also for example as a modulo magnification arrangement, as it is described e.g. in WO 2009/000528 A1. The content with regard to the formation of a modulo magnification arrangement of WO 2009/000528 A1 is hereby incorporated into the present application. With a modulo magnification arrangement the image to be represented need not necessarily be composed of a grating of periodically repeating single motifs, in contrast to a moire magnification arrangement. A complex single image with high resolution can be represented. In the moire magnification arrangement, the image to be represented normally consists of single motifs (here microstructures 9) which are arranged periodically in a grating and which are represented in magnified form by the lenses I 0, the area associated with each single motif maximally corresponding approximately to the area of the corresponding lens cell.

In the described embodiment, the micro lenses 10 as well as the sawtooth structure for the reflective facets can be manufactured simultaneously side by side by means of only a single embossing of the embossed layer 7.

Subsequently, the facets only need to be metallized in order that they act reflectively. The construction according to FIG. 3 is hence quick to manufacture.

Instead of the described sawtooth arrangement, in the second micro-optic representation arrangement 17 there can also be used Fresnel structures or relief simulations by diffractive structures or matt-structure grating images.

Figure 8:
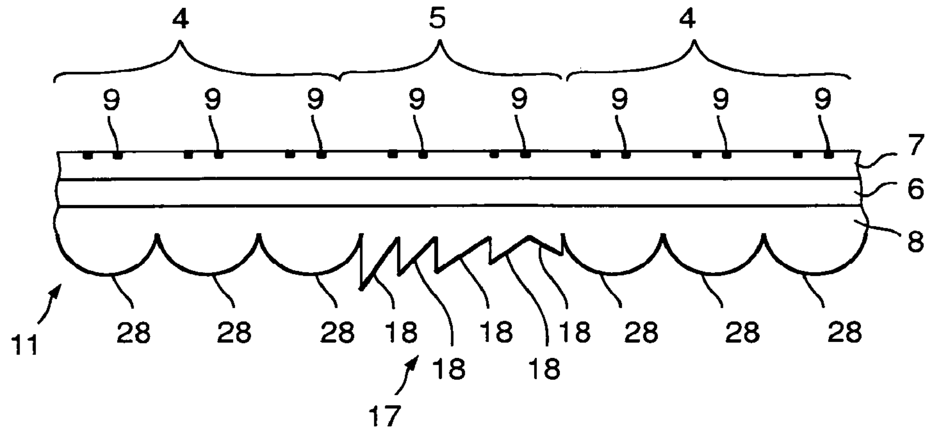
FIG. 8 a sectional view of a further embodiment of the security element of the invention.

In FIG. 8 there is shown a modification of the security element I of the invention wherein the first micro-optic representation arrangement 11 has, instead of the micro lenses 10, concave mirrors 28 which are formed by embossing of the lower embossing lacquer layer 8 and application of a specular coating.

Also the second micro-optic representation arrangement 17, in the embodiment formed as facets 18, is formed on the lower embossing lacquer layer 8. The facets 18 can be formed in the same way as the micro-concave mirrors 28 by embossing and mirror-coating.

The microstructures 9 can be provided not only in the region of the first motif part 4, but also in the region of the second motif part 5 and thus above the facets 18. This facilitates the manufacture of the security element 1.

If the microstructures 9 are provided in the region of the second motif part 5 and filled with an ink, the bulged specular surface, which is simulated by the facets 18, likewise appears slightly colored. If the coloring of the bulged specular surfaces is not desired, the microstructures 9 in this region, however, can also be omitted.

Figure 9:
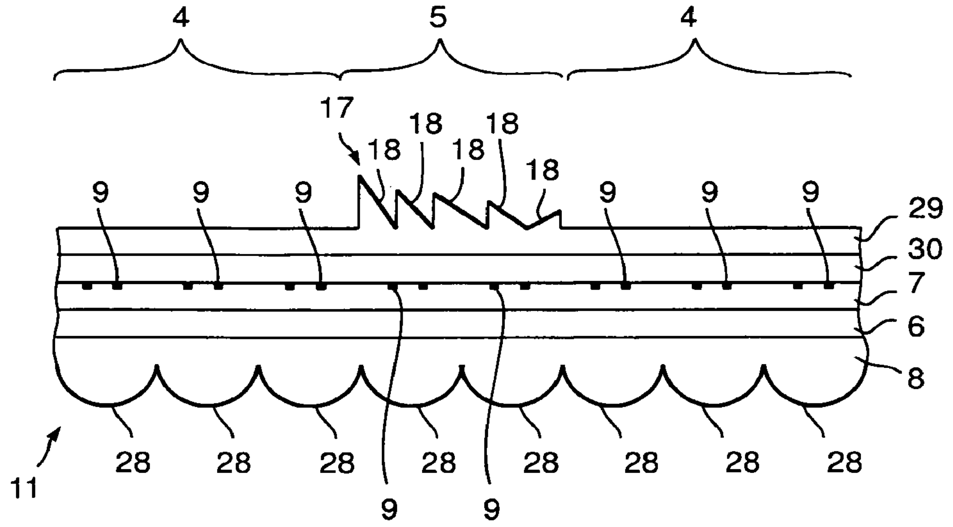
FIG. 9 a sectional view of a still further embodiment of the security element of the invention.

In FIG. 9 there is shown a construction of the security element I wherein the micro-concave mirrors 28, the microstructures 9 and the facets 18 are respectively embossed separately in their own embossing lacquer layers 8, 7 and 29. Between the embossing lacquer layers 8 and 7 there is provided a first carrier foil 6 and between the embossing lacquer layers 7 and 29 a second carrier foil 30.

This construction requires more working steps for manufacture in comparison to the variants according to FIGS. 3 and 8, but offers the advantage that the origination of the micro-concave mirrors 28 and of the facets 18 can be effected separately from each other. The micro-concave mirrors 28 can even be the same in different designs, because there is always only required a homogeneous area covered with micro-concave mirrors 28. Once an original with very good imaging properties has been manufactured, it can be utilized for manufacturing many different security elements 1. In addition, for the manufacture of corresponding security elements with different motifs in the respectively first and second micro-optic representation arrangements 11, 17 the same embossing tool can be used for embossing the micro-concave mirrors 28, so that this, too, must be manufactured only once. Further, the micro-concave mirrors 28 and the facets 18 can be metallized differently, for example with different metals or coatings with color-shifting effects (e.g. thin-film systems in which the color varies in dependence on the viewing angle).

A particular advantage of the construction of FIG. 8 is that both the micro-concave mirrors 28 as well as the facets 18 are mirror-coated, while for example in the construction shown in FIG. 9 a demetallization is necessary in certain regions of the regions bordering the second micro-optic representation arrangement 17. The sharpness of the border between the two motif parts 4, 5 is then given by the corresponding tolerances of the demetallization. This limitation is not present in the construction according to FIG. 8, so that the bulged surface in the second motif part 5 can appear with particularly filigree contour against the background of the moire or modulo magnification arrangement in the first motif part 4.

In the variants according to FIGS. 8 and 9 with micro-concave mirrors, a further protective lacquer layer (not shown) can further advantageously be provided on the upper side and/or underside of the security element 1, so that the resistance as well as the protection from molding by forgers can be increased.

Figure 10:
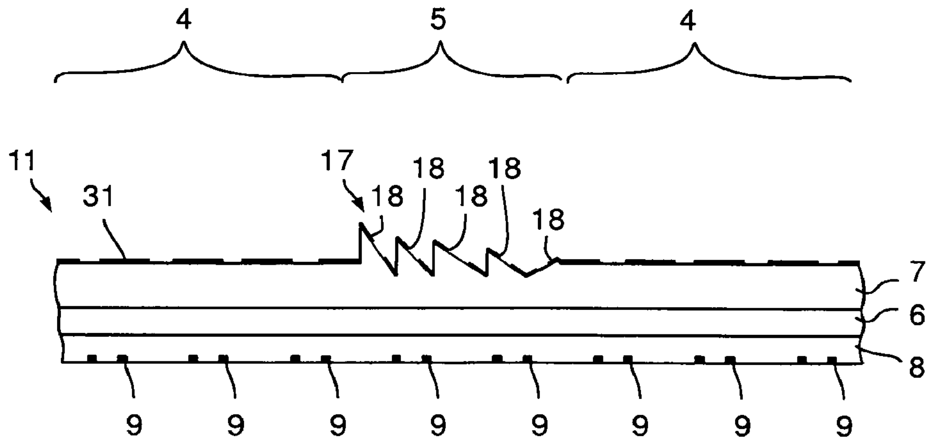
FIG. 10 a sectional view of a different embodiment of the security element of the invention.

In particular upon the viewing of the security element 1 in transmitted light against a bright light source, the first micro-optic representation arrangement 11 can also have, instead of a microfocusing element grid (grid of the micro lenses 10 or grid of the micro-concave mirrors 28), only a hole grid 31, as shown in FIG. 10. Such a hole grid 31 can be realized for example by periodically arranged holes or slots in an opaque, for example specularly metallized, layer. The holes here can be small gaps. In this case, the holes can be designated positive holes. There can also be provided so-called negative holes, the holes here being small, non-transparent or non-specular regions.

In the embodiment shown in FIG. 10, the hole grid also extends into the second motif region 5, so that a superimposition of the representations results in the second motif region. The security element can of course also be configured such that no hole grid is present in the second motif region 5.

Further, in the security element 1 of the invention, both the first micro-optic representation arrangement 11 and the second micro-optic representation arrangement 17 can be realized by means of diffractive structures. Thus, there can be provided in the first motif part 4 for example a hologram with a stereographic 3D representation which is constructed from microscopically small sine gratings. In the second motif part 5 preferably asymmetric diffraction gratings are arranged such that the reflection behavior of a bulged surface (where possible) is simulated achromatically, as this is described e.g. in WO 2006/013215 A1, whose disclosure in this regard is incorporated herewith.

As already described in connection with FIG. 10, the two motif parts 4 and 5 can at least partly overlap. Alternatively or additionally, the two motif parts 4 and 5 can also be nested in each other in certain regions. In this case, the areas of the two motif parts 4, 5 can be split up for example into complementary areal elements and then joined to an overall motif. In so doing, each motif part loses a part of its image information, which in the areal elements in question is replaced by the image information of the respective other areal element. If the dimensions of the areal elements are below the resolving power of the eye, the viewer perceives the individual impressions of the two motif parts simultaneously and processes them to an overall motif. The area proportions of the areal elements stemming from the two motif parts can here be distributed locally and/or globally equally or differently. If there is an imbalance, the motif part with the larger area proportion may visually dominate relative to the motif part with the smaller proportion. Generally, it is also possible, however, to employ areal elements which are above the resolving power of the eye. In this case, the viewer can perceive the individual motif parts locally separated.

In an embodiment in which the first micro-optic representation arrangement 11 is configured as a moire magnification arrangement with micro lenses 10 and the second micro-optic representation arrangement 17 has the reflective facets 18, e.g. in the nested region every second micro lens 10 of the first micro-optic representation arrangement 11 can be replaced by one or several reflective facets 18 of the second micro-optic representation arrangement 17.

The motif region 3 of the security element 1 can further be divided e.g. into small tiles or thin strips, which are respectively occupied by elements of the first or second micro-optic representation arrangement 11, 17. Thus, there results an interesting effect, since the representation of the second motif part 5 is no longer purely metallically specular, but partly transparent, so that one sees through the second micro-optic representation arrangement 17 an image of the first motif part 4 for example located in depth. Alternatively, it is also possible that the object represented by means of the first micro-optic representation arrangement 11 seems to lie or float in front of the surface of the second micro-optic representation arrangement 17, which surface has a bulged appearance.

Depending on the area proportion of the first and second micro-optic representation arrangements 11, 17 one can continuously change from a metallically lustrous opaque bulge to a representation becoming ever more see-through transparent and ultimately appearing rather glassy.

The first and/or second micro-optic representation arrangement(s) 11, 17 can be furnished wholly or partly with a color-shifting coating, in particular a thin-film system with reflector/dielectric/absorber. This makes it possible to further enhance the optical attractiveness and further increase the forgery resistance.

The security element I of the invention can be arranged on the bank note 2 such that it is visible not only from the front side shown in FIG. 1, but also from the back side of the bank note. Not necessarily all of the generated bulge or depth effects here must be visible from both sides, however.

Figure 11:
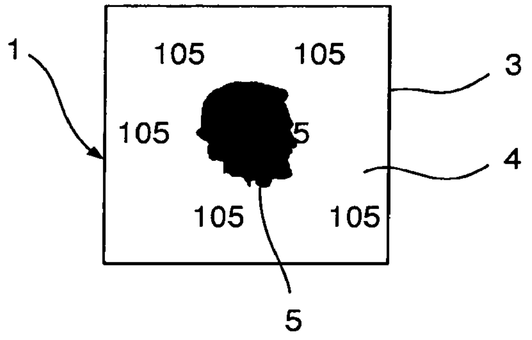
FIG. 11 a front view of a further embodiment of the security element of the invention.
Figure 12:
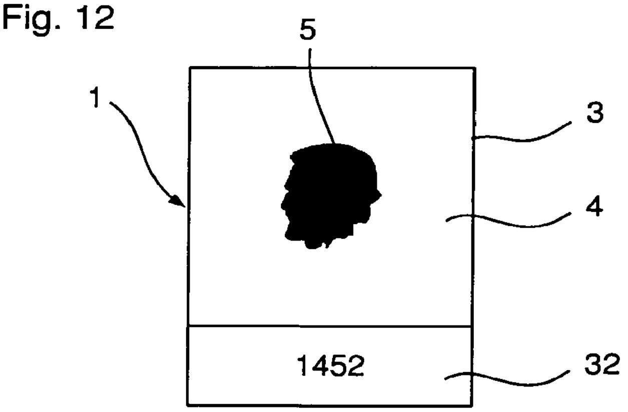
FIG. 12 a back view of the security element of the invention of FIG. 11.

An advantageous embodiment is represented in FIGS. 11 (front view) and 12 (back view). The security element I has in the first motif part 4 a first micro-optic representation arrangement 11 according to FIG. 8, which here periodically repeatingly represents in depth the number I 05. In the second motif part 5 there is visible a representation, of bulged appearance, of a portrait, the representation appearing bulged from both sides (thus also from the back side according to FIG. 12). This can be realized e.g. by means of facets 18 according to FIG. 8. From the back side, in the region of the first motif part 4 the viewer looks, however, at the back side of the micro-concave mirrors 28 of the first micro-optic representation arrangement 11, so that he can perceive there only a matt metallized region (in FIG. 12 in the first motif part 4 the numbers 105 are therefore not drawn in).

In order to make the security element 1 according to the invention, viewed from the back side, more attractive, for example in a second motif region 32 adjoining the motif region 3 a further bulged representation (here the number 1452) can therefore be realized by means of reflective facets in the same way as in FIG. 8. The second motif region 32 and thus the number 1452 is visible here only from the back side (from the front side the number would appear laterally reversed). This can be achieved in particular by the security element 1 being arranged in a window region of the bank note, which is only as large as the motif region 3, so that the second motif region 32 is hidden and can therefore be seen only from the back side.

Advantageously, selectively only certain regions in the first and second motif region 3 and 32 can be coated with a color-shifting thin-film system. Thus, e.g. the second motif part 5 as well as the motif region 32 can be coated on the back side (FIG. 12) with a color-shifting thin-film system, so that these elements then appear with changing color before the metallically matt and colorless background of the back sides of the micro-concave mirrors in the first motif region 4.

Of course, the security element I according to the invention can be so developed that both the bulge effect and the depth effect can be seen from both sides of the security element 1.

In the embodiments hitherto described, the first micro-optic representation arrangement 11 in the first motif part 4 was respectively configured so as to obtain a stereographic representation with depth information. This is understood here to mean representations in which a three-dimensional effect is generated by the security element 1 providing the viewer's left and right eyes with different views of an object which respectively show the object viewed from the corresponding direction. From these different views there then arises absolute depth information for a viewer, resulting altogether in a three-dimensional impression. The employed representations in this class can often have more than only two different views, which usually also results in a parallax (i.e. upon rotation or east-west tilt the image components in the foreground move relative to the image components in the image background). In some cases one can for example, by rotation, also look behind an object that is in the foreground.

This can be realized technically by three-dimensional holograms, for example directly exposed holograms or computer-generated stereograms. Further examples are microlens tilt images and moire magnification arrangements with depth effect and/or kinetic effect, as described e.g. in WO 2007/076952 A2 or WO 2009/000527 A1.

In the second micro-optic representation arrangement 17 in the second motif part 5 by directional reflection a bulge is imitated, from which results only indirectly a depth effect or a three-dimensional effect. In these kinds of representations no parallax is shown, so that a representation in front of or behind a reference plane is not readily possible. This class of representation type includes for example reflective Fresnel structures having a lens-like bulged appearance (e.g. EP I 570 422 B1, EP 1 562 758 B 1), diffractive achromatic elements with bulge effect (e.g. WO 2006/013215 A I), matt-structure grating images having a bulged appearance (e.g. WO 2010/034420 A1) or in particular also security elements, having a reliefed appearance, based on micro21 optic sawtooth gratings, as described in connection with FIG. 5 for example in the present application. All of these embodiments have in common that an at least partly mirror-coated surface, which is virtually plane on a larger length scale, infringes on a larger length scale the law implicitly taken for granted by the viewer that angle of incidence is equal to angle of emergence upon reflections, by for example the orientation of the respective surface normal locally deviating from the security element's reference plane, which is visible to the viewer, with the help of micromirrors not recognizable with the naked eye, and/or the incident light being diffracted by diffraction effects in directions unexpected by the viewer.

In a further embodiment, the first micro-optic representation arrangement 11 can now be configured such that in the first motif part 4 the parallax does not correspond exactly to the parallax of an object located in depth. This can be realized for example by moire magnification arrangements or modulo magnification arrangements. It can thereby be achieved that upon tilting or rotation of the security element I an additional kinetic effect occurs in the first motif part 4. This may be an orthoparallactic motion, as described e.g. in WO 2007/076952 A2, wherein the representations for the viewer's left and right eyes permit no assignment of a depth, strictly speaking, because the viewing directions from which the viewer sees the object with his left and right eyes do not intersect. In a preferred variant, only a relatively small error of the parallax is present, so that the viewing directions (14 and 15 in FIG. 4) almost intersect and the viewer sees an object that moves upon tilting or rotation of the security element 1, but which he, despite the parallax error, ranges clearly e.g. at a depth located behind the plane of the security element 1.

In the A matrix formalism of the application WO 2009/000528 A1, a representation with correct parallax corresponds to a representation with an A matrix which is only populated on the main diagonal. In an orthoparallactic representation the A matrix is only populated at the places not located on the main diagonal. A small parallax error within the meaning of the present invention is present when the A matrix is populated on the main diagonal as well as therebeside.

Similarly to the above-described special embodiments of moire or modulo magnification arrangements where the parallax does not exactly correspond to the parallax of an object located in depth so that in extreme cases an orthoparallactic motion arises, also the second micro-optic representation arrangement can have "errors" in the orientations of the microscopic structures in comparison to the orientation of the simulated surface. Such an effect is present for example with a so-called imaginary area. This is understood here to be the formation of a reflection or transmission behavior which cannot be produced with a real bulged reflective or transmissive surface. If for example the azimuth angles of all facets are rotated by 90° to the right, a relief illuminated from the top looks like it is illuminated from the right. Furthermore, upon tilting, the light reflexes in this case do not move as expected with the simulated relief, but likewise "orthoparallactic" which can be a very surprising effect. To a viewer, however, such representations also appear bulged on the first glance. For the bulge impression according to the invention it is thus not important here that the orientation of the microstructures necessarily actually reproduces exactly the reflection behavior of a real bulged surface.

In a further embodiment of the security element 1, the representation by means of the first micro-optic representation arrangement 11 in the first motif part 4 can change from a first image to a second image upon an east-west tilting or rotation of the security element 1. Thus, for example an image, located in depth, of a first symbol A could tilt into at least one other representation, for example a symbol B, upon tilting of the security element 1.

The first micro-optic representation arrangement 11 can also realize additional effects besides a three-dimensional effect, for example also kinematic effects (motions, pumping effect, etc.) besides the above-mentioned tilt images. In the above-mentioned modulo magnification arrangements, the three-dimensional representation in the first motif part 4 can move upon tilting of the security element 1. Alternatively, as of a certain tilting angle the representation could also tilt into the representation of a completely different object not necessarily likewise appearing three-dimensionally (for example a number located in depth can change to another representation, for example a symbol then moving upon further tilting).

The quality or the appearance of the two micro-optic representation arrangements respectively can show a different dependence on the employed viewing or illumination situation. Thus, for example a stereogram realized by hologram gratings is well recognizable only in almost parallel illumination from the proper direction, while in diffuse illumination it is perceived blurredly or not at all. The second micro-optic representation arrangement of bulged appearance according to the invention, however, is also in diffuse illumination very well recognizable from a broad angular range. Other combinations can show in plan view or in transmission first and second micro-optic representation arrangements of varying recognizability. The first micro-optic representation arrangement may consist of for example a moire magnification arrangement on the basis of a microlens grid, which in plan view and in transmission for example shows a depth effect, while a second micro-optic representation arrangement formed by metallized sawtooth structures can show in plan view the desired bulge effect and in transmission can only appear opaque. The security element according to the invention can accordingly be configured such that depending on the viewing and/or illumination situation the representation of one of the two micro-optic representation arrangements dominates, while the representations in a different viewing or illumination situation supplement each other to an overall motif.

The security element 1 according to the invention can also be configured e.g. as a security thread 33, as shown in FIG. 1. Further, the security element 1 can not only, as described, be formed on a carrier foil from which it can be transferred to the value document 2 in a known way. It is also possible to form the security element 1 directly on the value document. It is thus possible to carry out a direct printing onto a polymer substrate with subsequent embossing of the security element, in order to form a security element according to the invention on plastic bank notes for example. The security element of the invention can be formed in many different substrates. In particular, it can be formed in or on a paper substrate, a paper with synthetic fibers, i.e. paper with a content x of polymeric material in the range of O<x<I 00 wt %, a plastic foil, e.g. a foil of polyethylene (PE), polyethylene terephthalate (PET), polybutylene terephthalate (PBT), polyethylene naphthalate (PEN), polypropylene (PP) or polyamide (PA), or a multilayer composite, in particular a composite of several different foils (compound composite) or a paper-foil composite (foil/paper/foil or paper/foil/paper), whereby the security element can be provided in or on or between each of the layers of such a multilayer composite.

In the hitherto described embodiments it was tacitly assumed that the micro-representation arrangements are located on plane substrates. The designs according to the invention can also be advantageously used, however, with curved or flexible substrates, such as labels, value papers or bank notes.

LIST OF REFERENCE SIGNS

| | |
|---|---|
| 1 | Security element |
| 2 | Bank note |
| 3 | Motif region |
| 4 | First motif part |
| 5 | Second motif part |
| 6 | Carrier foil |
| 7 | Upper embossing lacquer layer |
| 8 | Lower embossing lacquer layer |
| 9 | Microstructures |
| 10 | Micro lenses |
| 11 | First micro-optic representation |
| 12 | Position |
| 13 | Position |
| 14 | Direction |
| 15 | Direction |
| 16 | Position |
| 17 | Second micro-optic representation |
| 18 | Facets |
| 19 | Surface |
| 20 | Light beam |
| 21 | Direction |
| 21' | Direction |
| 22 | Light beam |
| 23 | Direction |
| 23' | Direction |
| 24 | Light beam |
| 25 | Direction |
| 25' | Direction |
| 26 | Local surface normal |
| 27 | Macroscopic surface normal |
| 28 | Micro-concave mirror |
| 29 | Embossing lacquer layer |
| 30 | Second carrier foil |
| 31 | Hole grid |
| 32 | Motif region |
| 33 | Security strips |
| Pl | Arrow |
| dl | Distance |
| d2 | Distance |

The invention claimed is:

1. A security element for a security paper or value document comprising:

a carrier comprising a motif region which provides a visually perceptible motif having a first motif part and a second motif part;

wherein the motif region comprises a first micro-optic representation arrangement which presents at least two different images in viewing angle-dependent fashion as the first motif part, and a second micro-optic representation arrangement which presents a reflective surface as the second motif part, said reflective surface appearing bulged relative to an actual macroscopic spatial form of the second micro-optic representation arrangement;

wherein the second micro-optic representation arrangement has embossed microscopic structures which are furnished with a refection enhancing coating;

wherein the second micro-optic representation arrangement has a multiplicity of reflective facets with different orientations to each other, lateral dimensions of the reflective facets being smaller than 300 μm;

wherein the multiplicity of reflective facets is formed by a sawtooth grating including a plurality of sawteeth, a width of each sawtooth of the plurality of sawteeth being smaller than 300 μm and a height of each sawtooth of the plurality of sawteeth being smaller than 20 μm.

2. The security element according to claim 1, wherein the first and second motif parts are arranged to be contiguous.

3. The security element according to claim 1, wherein one of the first and second motif parts at least partly surrounds another one of the first and second motif parts.

4. The security element according to claim 1, wherein the first and second motif parts either or both at least partly overlap and are at least in certain regions nested into each other.

5. The security element according to claim 1, wherein the first micro-optic representation arrangement presents the at least two different images such that the images at least in certain regions either or both overlap and are nested into each other.

6. The security element according to claim 1, wherein the first micro-optic representation arrangement presents different views of a same object as the at least two different images.

7. The security element according to claim 1, wherein the first micro-optic representation arrangement presents the at least two different images such that for a viewer there results a stereographic representation of an object with absolute depth information.

8. The security element according to claim 1, wherein the first micro-optic representation arrangement is configured as a hologram.

9. The security element according to claim 1, wherein the first micro-optic representation arrangement comprises microstructures and micro-imaging elements in order to image the microstructures in magnified form.

10. The security element according to claim 9, wherein micro-imaging elements of the first micro-optic representation arrangement and the microscopic structures of the second micro-optic representation arrangement are embossed in a same embossing lacquer layer.

11. The security element according to claim 1, wherein the first micro-optic representation arrangement produces an orthoparallactic representation.

12. The security element according to claim 1, wherein the second micro-optic representation arrangement presents the reflective surface in a reliefed impression.

13. The security element according to claim 1, wherein the different orientations of the reflective facets of the second micro-optic representation arrangement are chosen such that due to reflection directions, for a viewer a bulged surface is imitated or simulated.

14. The security element according to claim 1, wherein the security element is configured as a multilayer layered composite.

15. The security element according to claim 1, wherein each of the multiplicity of reflective facets comprises a plane surface.

16. A value document comprising a security element, the security element comprising:

a carrier comprising a motif region which provides a visually perceptible motif having a first motif part and a second motif part;

wherein the motif region comprises a first micro-optic representation arrangement which presents at least two different images in viewing angle-dependent fashion as the first motif part, and a second micro-optic representation arrangement which presents a reflective surface as the second motif part, said reflective surface appearing bulged relative to an actual macroscopic spatial form of the second micro-optic representation arrangement;

wherein the second micro-optic representation arrangement has embossed microscopic structures which are furnished with a refection enhancing coating;

wherein the second micro-optic representation arrangement has a multiplicity of reflective facets with different orientations to each other, lateral dimensions of the reflective facets being smaller than 300 μm;

wherein the multiplicity of reflective facets is formed by a sawtooth grating including a plurality of sawteeth, a width of each sawtooth of the plurality of sawteeth being smaller than 300 μm and a height of each sawtooth of the plurality of sawteeth being smaller than 20 μm.

17. A security element for a security paper or value document comprising:

a carrier comprising a motif region which provides a visually perceptible motif having a first motif part and a second motif part;

wherein the motif region comprises a first micro-optic representation arrangement which presents at least two different images in viewing angle-dependent fashion as the first motif part, and a second micro-optic representation arrangement which presents a reflective surface as the second motif part, said reflective surface appearing bulged relative to an actual macroscopic spatial form of the second micro-optic representation arrangement;

wherein the second micro-optic representation arrangement has embossed microscopic structures which are furnished with a refection enhancing coating; and wherein the second micro-optic representation arrangement has a multiplicity of reflective facets with different orientations to each other, lateral dimensions of the reflective facets being smaller than 300 μm;

wherein the first micro-optic representation arrangement comprises microstructures and micro-imaging elements to image the microstructures in magnified form, the microstructures being provided both in a region of the first motif part and in a region of the second motif part.

* * * * *